(12) United States Patent
Huang et al.

(10) Patent No.: US 11,971,844 B2
(45) Date of Patent: Apr. 30, 2024

(54) CHIPLET SYSTEM AND POSITIONING METHOD THEREOF

(71) Applicant: Sunplus Technology Co., Ltd., Hsinchu (TW)

(72) Inventors: Hsing-Sheng Huang, Hsinchu (TW); Hao-Chang Chang, Taipei (TW); Ming-Chang Su, Hsinchu County (TW); Hwan-Rei Lee, Hsinchu (TW)

(73) Assignee: SUNPLUS TECHNOLOGY CO., LTD., Hsinchu (TW)

( * ) Notice: Subject to any disclaimer, the term of this patent is extended or adjusted under 35 U.S.C. 154(b) by 51 days.

(21) Appl. No.: 18/070,514

(22) Filed: Nov. 29, 2022

(65) Prior Publication Data
US 2023/0195682 A1 Jun. 22, 2023

(30) Foreign Application Priority Data
Dec. 22, 2021 (TW) .................. 110148206

(51) Int. Cl.
*G06F 15/173* (2006.01)
*G06F 13/40* (2006.01)
*G06F 15/78* (2006.01)

(52) U.S. Cl.
CPC .... *G06F 15/17306* (2013.01); *G06F 13/4027* (2013.01); *G06F 15/7835* (2013.01)

(58) Field of Classification Search
CPC .................. G06F 15/17306; G06F 15/7835
See application file for complete search history.

(56) References Cited

U.S. PATENT DOCUMENTS

| | | | |
|---|---|---|---|
| 11,294,848 B1 * | 4/2022 | Walker | G06F 13/423 |
| 2021/0233892 A1 * | 7/2021 | Sikka | H01L 25/50 |
| 2022/0181297 A1 * | 6/2022 | Li | H01L 23/49827 |

* cited by examiner

Primary Examiner — Michael J Metzger
(74) Attorney, Agent, or Firm — WPAT, P.C

(57) ABSTRACT

A chiplet system and a positioning method thereof are provided. The positioning method of the chiplet system includes the following steps. Two end chiplets and a plurality of middle chiplets are classified. A quantity calculation packet is transmitted and accumulated from each of the end chiplets towards another end to analyze a quantity of middle chiplets. A serial number comparison packet is transmitted and accumulated from each of the middle chiplets connected to one of the end chiplets towards another end to set a starting point. An identify number setting packet is transmitted and accumulated from the middle chiplet set as the starting point towards another end to set a positioning number of each of the middle chiplets.

15 Claims, 6 Drawing Sheets

CHIPLET SYSTEM AND POSITIONING METHOD THEREOF

This application claims the benefit of Taiwan application Serial No. 110148206, filed Dec. 22, 2021, the subject matter of which is incorporated herein by reference.

BACKGROUND OF THE INVENTION

Field of the Invention

The invention relates in general to a semiconductor device and an operation method thereof, and more particularly to a chiplet system and a positioning method thereof.

Description of the Related Art

As various electronic products are provided one after another, the demand for high efficiency, low power consumption and multi-function chips manufactured using a high-end process is getting stronger and stronger. As the function increases, chip size also increases.

The increase in chip efficiency used to rely on the improvement in the semiconductor process. However, the closer to the physical limits of Moore's Law the size of an element is, the more difficult the miniaturization of chips becomes. To further increase the product efficiency, a chiplet technology is provided. The original chiplet is divided into several chiplets, and chiplets with common functions are manufactured together. For instance, basic chiplets are manufactured using a low-end semiconductor process, and high-end chiplet are manufactured using a high-end semiconductor process. Through heterogeneous integration, the manufacturers can flexibly combine the chiplets to form different package products, not only effectively increasing the product efficiency but also increasing the yield rate of production.

SUMMARY OF THE INVENTION

The invention is directed to a chiplet system and a positioning method thereof. Each time when the chiplet system is electrified to operate, the positioning number of each chiplet can be obtained through analysis, and there is no need to pre-set positioning numbers in the semiconductor process. Thus, the manufacturing cost of semiconductor can be greatly reduced; furthermore, in the packaging process, the middle chiplets can be flexibly connected in series, so that the manufacturing flexibility can be greatly increased.

According to one embodiment of the present invention, a positioning method of a chiplet system is provided. The positioning method of the chiplet system includes the following steps. Two end chiplets and a plurality of middle chiplets are classified. A quantity calculation packet is transmitted and accumulated from each of the end chiplets towards another end to analyze a quantity of the middle chiplets. A serial number comparison packet is transmitted and accumulated from each of the middle chiplets connected to one of the end chiplets towards another end to set a starting point. An identify number setting packet is transmitted and accumulated from the middle chiplet set as the starting point towards another end to set a positioning number of each of the middle chiplets.

According to another embodiment of the present invention, a chiplet system is provided. The chiplet system includes two end chiplets and a plurality of middle chiplets. Each of the end chiplets includes a type determination module and a quantity analysis module. The type determination module is configured to identify each of the end chiplets. The quantity analysis module is configured to analyze a quantity of the middle chiplets. Each of the middle chiplets includes a type determination module, a starting point setting module and a positioning number setting module. The type determination module is configured to identify each of the middle chiplets. The starting point setting module is configured to set a starting point. The positioning number setting module is configured to set a positioning number of each of the middle chiplets.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
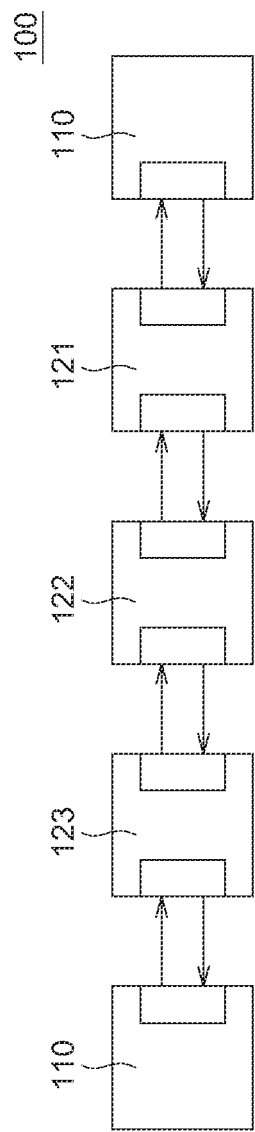
FIG. 1 is a schematic diagram of a chiplet system according to an embodiment.

Referring to FIG. 1, a schematic diagram of a chiplet system 100 according to an embodiment is shown. The chiplet system 100 includes two end chiplets 110 and three middle chiplets 121, 122, and 123. The end chiplets 110 can be realized by peripheral circuits manufactured using a low-end process. The middle chiplets 121, 122, and 123 can be realized by core circuits manufactured using a high-end process.

Figure 2:
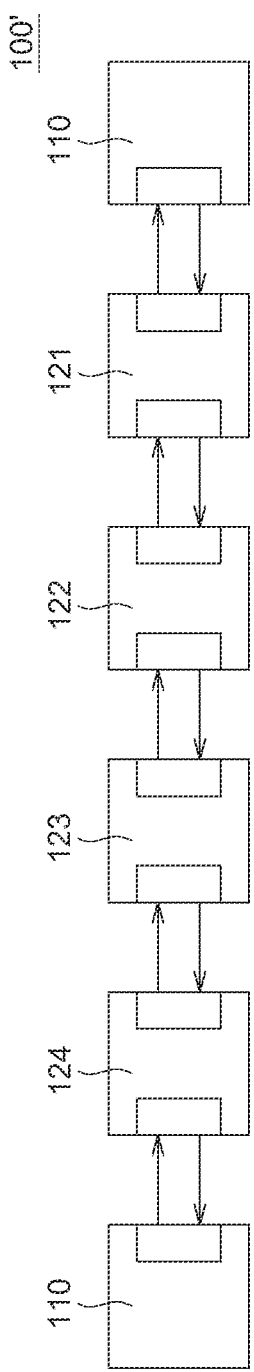
FIG. 2 is a schematic diagram of the chiplet system according to another embodiment.
Figure 3:
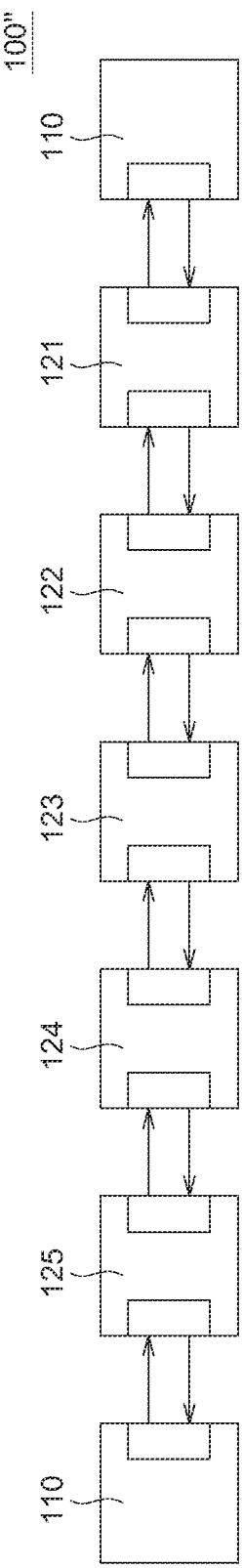
FIG. 3 is a schematic diagram of the chiplet system according to an alternate embodiment.

To provide different applications, the quantity of middle chiplets can be adaptatively adjusted. Referring to FIG. 2, a schematic diagram of a chiplet system 100' according to another embodiment is shown. The chiplet system 100' includes two end chiplets 110 and four middle chiplets 121, 122, 123, and 124. Referring to FIG. 3, a schematic diagram of a chiplet system 100" according to an alternate embodiment is shown. The chiplet system 100" includes two end chiplets 110 and five middle chiplets 121, 122, 123, 124, and 125. That is, the quantity of middle chiplet can be adaptatively adjusted with respect to difference applications.

In order to provide these applications, the middle chiplets 121, 122, 123, 124, and 125 must be provided with positioning numbers, so that the middle chiplets 121, 122, 123, 124, and 125 connected in series can operate normally. However, the manufacturing cost of the semiconductor process will greatly increase if different middle chiplets 121, 122, 123, 124, and 125 are manufactured according to the positioning numbers. In the packaging process, the middle chiplets 121, 122, 123, 124, and 125 must be connected in series according to the predetermined positioning numbers, therefore the manufacturing flexibility is greatly affected.

Figure 4:
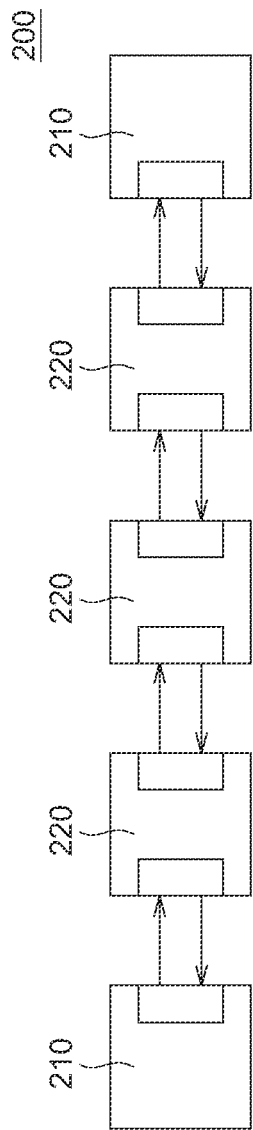
FIGS. 4 to 6 are schematic diagrams of the chiplet system according to several embodiments.
Figure 5:
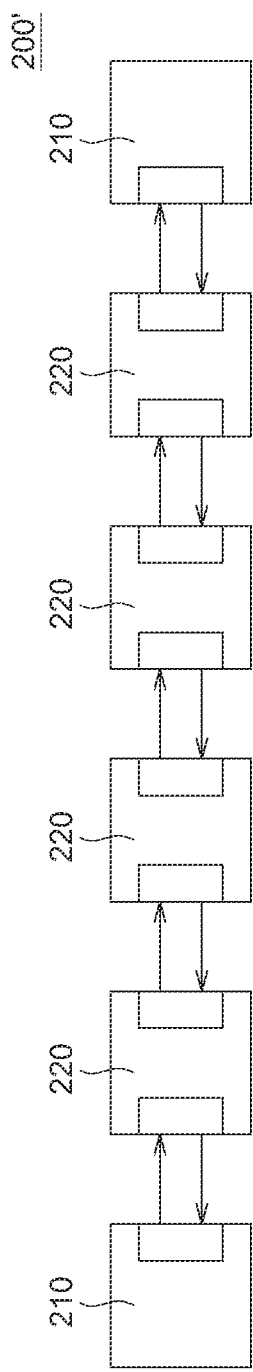
Figure 6:
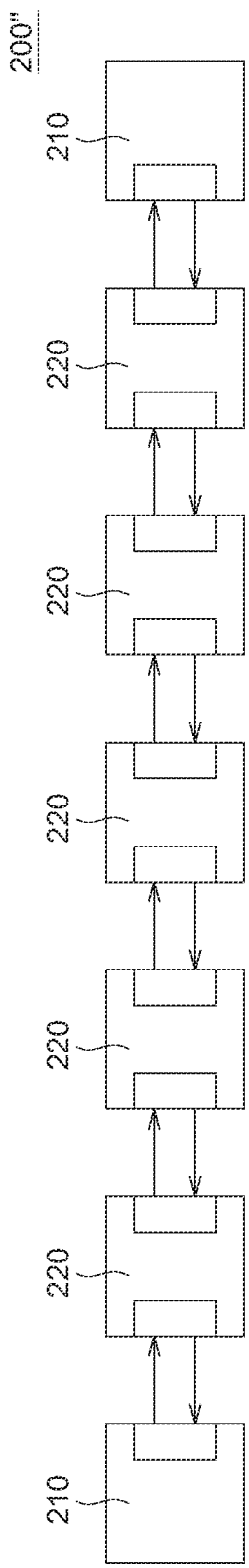

Referring to FIGS. 4 to 6, schematic diagrams of a chiplet system chiplet systems 200, 200', and 200" according to several embodiments are shown. The chiplet system 200 includes two end chiplets 210 and three middle chiplets 220. The chiplet system 200' includes two end chiplets 210 and four middle chiplets 220. The chiplet system 200" includes two end chiplets 210 and five middle chiplets 220. Through the technology of the present invention, the middle chiplets 220 can be identical middle chiplets, and there is no need to pre-set positioning numbers in the semiconductor process. Each time when the chiplet system 200, 200', and 200" are electrified to operates, the positioning number of each middle chiplet 220 can be obtained through analysis, and there is no need to pre-set positioning numbers in the semiconductor process. Thus, the manufacturing cost of semiconductor can be greatly reduced; furthermore, in the packaging process, the middle chiplets 220 can be flexibly connected in series, so that the manufacturing flexibility can be greatly increased.

Figure 7:
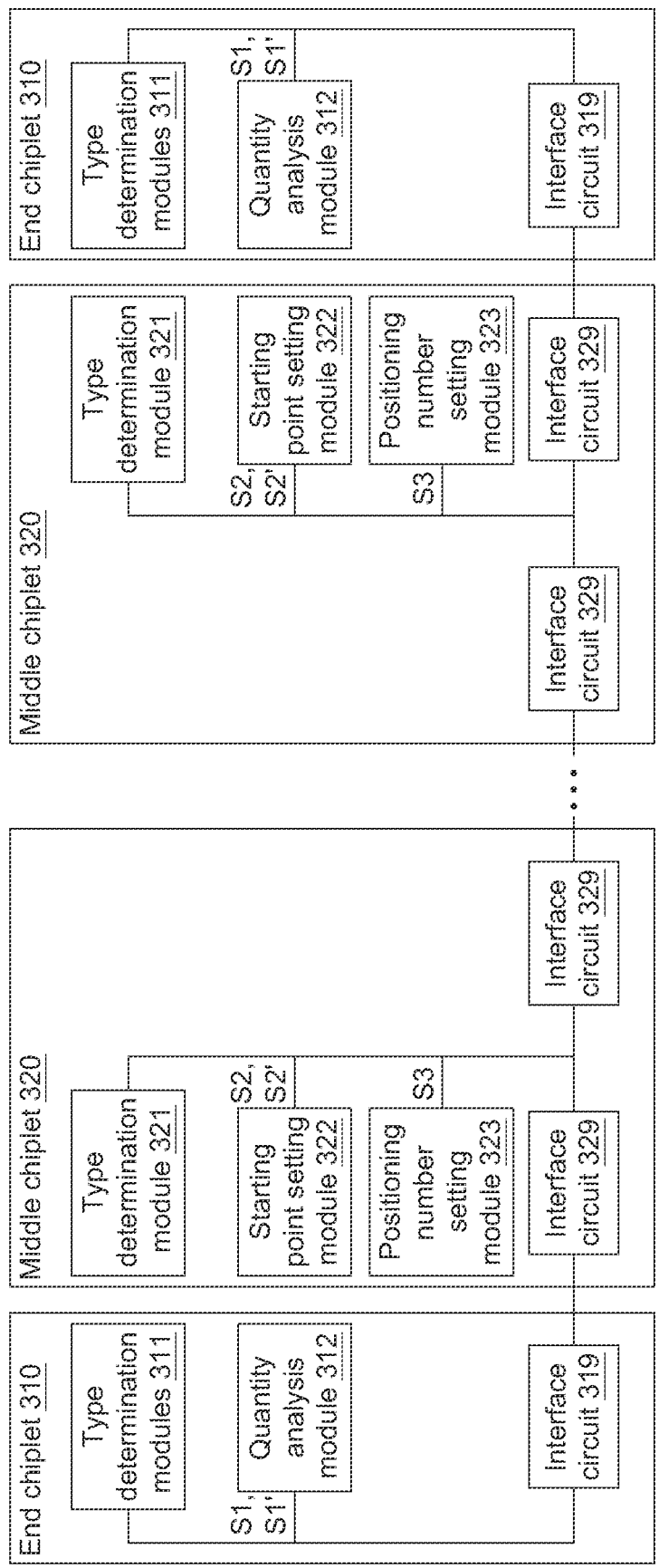
FIG. 7 is a block diagram of the chiplet system according to an embodiment.

Referring to FIG. 7, a block diagram of a chiplet system 300 according to an embodiment is shown. The end chiplet 310 includes a type determination modules 311, a quantity analysis module 312 and an interface circuit 319. The middle chiplet 320 includes a type determination module 321, a starting point setting module 322, a positioning number setting module 323 and two interface circuits 329. Brief descriptions of the functions of each element are disclosed below. The type determination modules 311 and 321 are used to identify whether one chiplet is the end chiplet 310 or the middle chiplet 320. The quantity analysis module 312 is used to analyze the quantity of middle chiplets 320. The starting point setting module 322 is used to set a starting point SP (illustrated in FIG. 11). The positioning number setting module 323 is used to set a positioning number ID (illustrated in FIG. 12) of each middle chiplet 320 (illustrated in FIG. 12). In the present embodiment, each time when the chiplet system 300 is electrified, through the transmission of packets, the quantity of middle chiplets 320 is automatically analyzed and the positioning number ID (illustrated in FIG. 12) is automatically set, and there is no need to pre-set positioning numbers in the semiconductor process. Thus, the manufacturing cost of semiconductor can be greatly reduced; furthermore, in the packaging process, the middle chiplets 320 can be flexibly connected in series, so that the manufacturing flexibility can be greatly increased. The operations of each element disclosed above are explained below with an accompanying flowchart.

Figure 8:
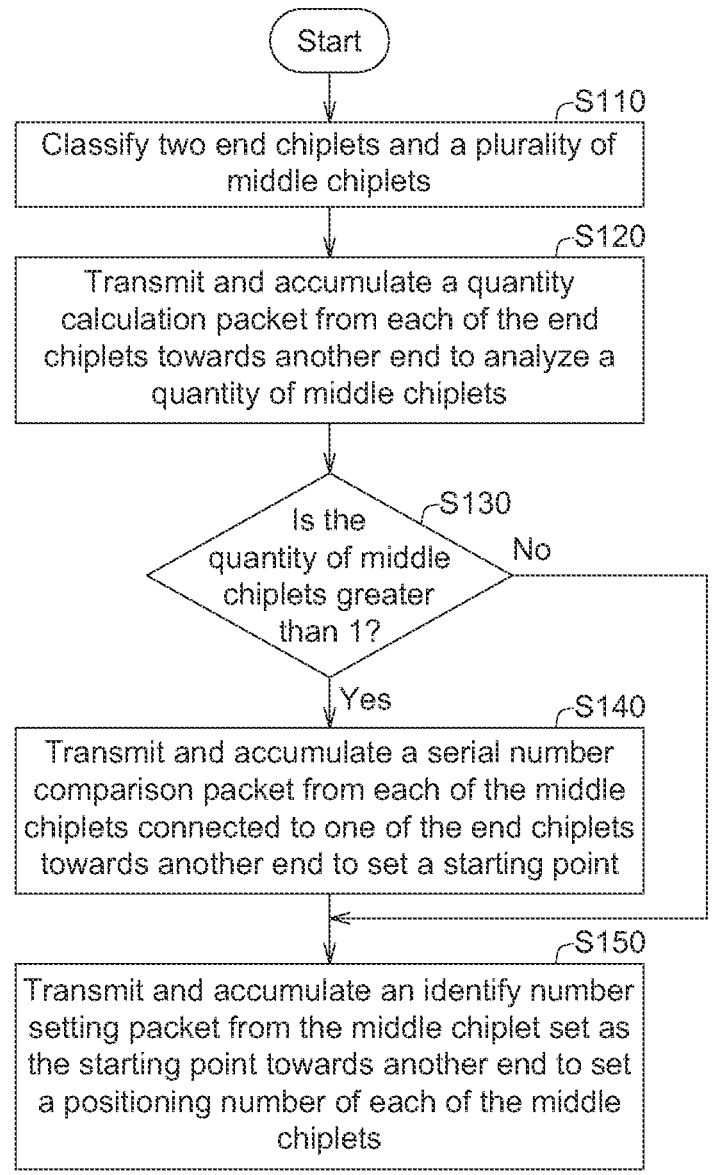
FIG. 8 is a flowchart of a positioning method of the chiplet system according to an embodiment.

Refer to FIG. 8 and FIGS. 9 to 12. FIG. 8 is a flowchart of a positioning method of a chiplet system 300 according to an embodiment. FIGS. 9 to 12 are schematic diagrams of each step of FIG. 8. According to the positioning method of the chiplet system 300, each time when the chiplet system 300 is electrified, the positioning number ID of each middle chiplet 320 is automatically set, and the positioning number ID set in each time of electrification is consistent, so that the chiplet system 300 can operate normally.

Figure 9:
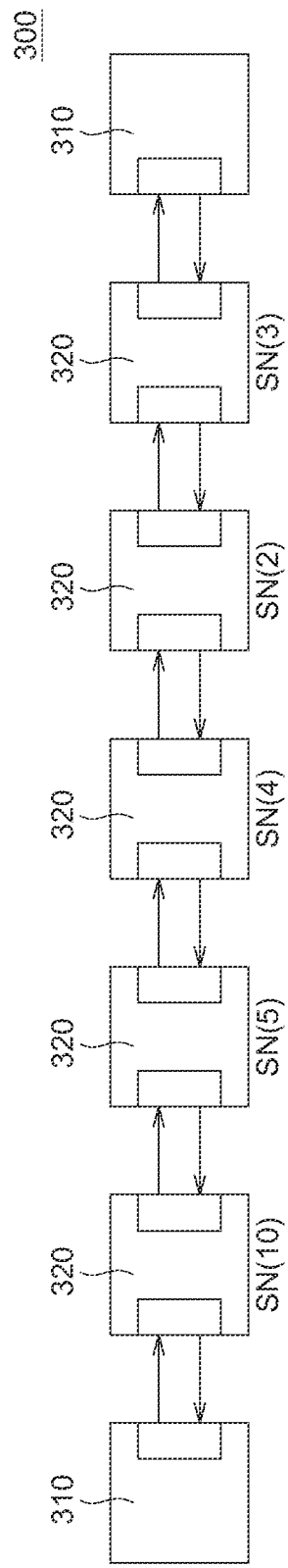
FIGS. 9 to 12 are schematic diagrams illustrating each step of FIG. 8.

In step S110 as indicated in FIG. 9, two end chiplets 310 and a plurality of middle chiplets 320 are classified by the type determination modules 311 and 321. In the present step, the end chiplets 310 and the middle chiplets 320 are classified by the type determination modules 311 and 321 according to the quantities of interface circuit 319 and 329. When the quantity of interface circuit 319 is 1, the type determination module 311 determines that the chiplet is the end chiplet 310; when the quantity of interface circuits 329 is 2, the type determination module 321 determines that the chiplet is the middle chiplet 320. In the present step, each of the type determination modules 311 and 321 determines respective chiplets, and after the chiplet is identified as the end chiplet 310 or the middle chiplet 320, the chiplet is marked in the memory or the register.

Figure 10:
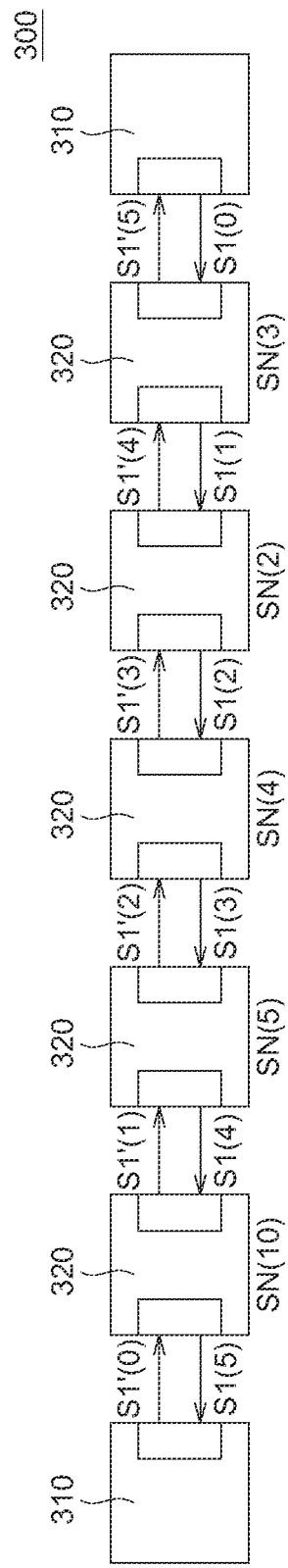

Next, the method proceeds to step S120 as indicated in FIG. 10, the quantity calculation packets S1 and S1' are transmitted and accumulated from the end chiplet 310 towards another end by the quantity analysis module 312 to analyze the quantity of middle chiplets 320.

As indicated in FIG. 10, the quantity calculation packet S1 is transmitted and accumulated from the end chiplet 310 at the right end towards the left end, and the value of the quantity calculation packet S1 is denoted in the brackets. The initial value of the quantity calculation packet S1 is 0, and is accumulated by 1 each time when the quantity calculation packet S1 is transmitted until all packets are transmitted to the end chiplet 310 at the left end.

Similarly, the quantity calculation packet S1' is transmitted and accumulated from the end chiplet 310 at the left end towards the right end, and the value of the quantity calculation packet S1' is denoted in the brackets. The initial value of the quantity calculation packet S1' is 0, and is accumulated by 1 each time when the quantity calculation packet S1' is transmitted until all packets are transmitted to the end chiplet 310 at the right end.

As indicated in FIG. 10, the number of times for which the quantity calculation packet S1 is transmitted through the middle chiplets 320 is the accumulative count of the quantity calculation packet S1, therefore the final value of the quantity calculation packet S1 is the quantity of middle chiplets 320.

Similarly, the number of times for which the quantity calculation packet S1' is transmitted through the middle chiplets 320 is the accumulative count of the quantity calculation packet S1', therefore the final value of the quantity calculation packet S1' is the quantity of middle chiplets 320.

Then, the method proceeds to step S130, whether the quantity of middle chiplets 320 is greater than 1 is determined. If the quantity of middle chiplets 320 is greater than 1, then the method proceeds to step S140; if the quantity of middle chiplets 320 is not greater than 1, then the method proceeds to step S150.

Figure 11:
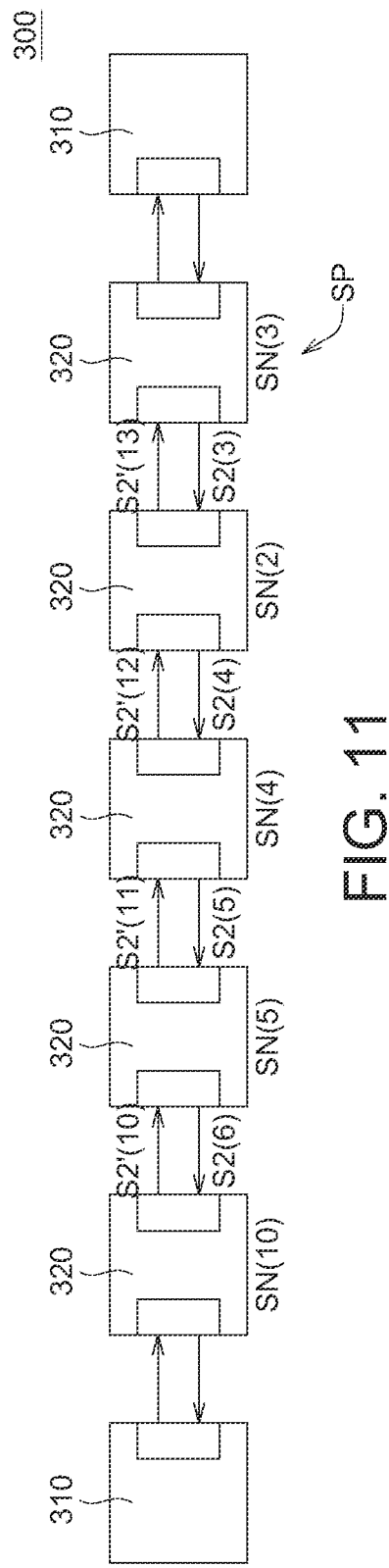

Then, the method proceeds to step S140 as indicated in FIG. 11, the serial number comparison packets S2 and S2' are transmitted and accumulated from the middle chiplet 320 connected to the end chiplet 310 (referred as the rightmost or the leftmost middle chiplet 320 here below) towards another end by the starting point setting module 322 to set the starting point SP.

As indicated in FIG. 11, the serial number comparison packet S2 is transmitted and accumulated from the rightmost middle chiplet 320 at the right end towards the left end, and the value in the brackets denotes the value of the serial number comparison packet S2. The initial value of the serial number comparison packet S2 is the chip serial number SN of the rightmost middle chiplet 320 (the value in the brackets denotes the value of the chip serial number SN), and is accumulated by 1 each time when the serial number comparison packet S2 is transmitted until all packets are transmitted to the leftmost middle chiplet 320.

Similarly, the serial number comparison packet S2' is transmitted and accumulated from the leftmost middle chiplet 320 at the left end towards the right end, and the value in the brackets denotes the value of the serial number comparison packet S2'. The initial value of the serial number comparison packet S2' is the chip serial number SN of the leftmost middle chiplet 320 (the value in the brackets denotes the value of the chip serial number SN), and is accumulated by 1 each time when the serial number comparison packet S2' is transmitted until all packets are transmitted to the rightmost middle chiplet 320.

As indicated in FIG. 11, the starting point setting module 322 of the rightmost middle chiplet 320 determines whether the chip serial number SN of the rightmost middle chiplet 320 is less than the chip serial number SN of the leftmost middle chiplet 320 according to the received serial number comparison packet S2' and the transmitted serial number comparison packet S2. Similarly, the starting point setting module 322 of the leftmost middle chiplet 320 determines whether the chip serial number SN of the leftmost middle chiplet 320 is less than the chip serial number SN of the rightmost middle chiplet 320 according to the received serial number comparison packet S2 and the transmitted serial number comparison packet S2'. In the present embodiment, the smaller one of the chip serial numbers SN is always set as the starting point SP (in another embodiment, the larger one of the chip serial numbers SN can always be set as the starting point SP). Thus, each time when the chiplet system 300 is electrified, the rightmost middle chiplet 320 is always determined as the starting point SP.

Figure 12:
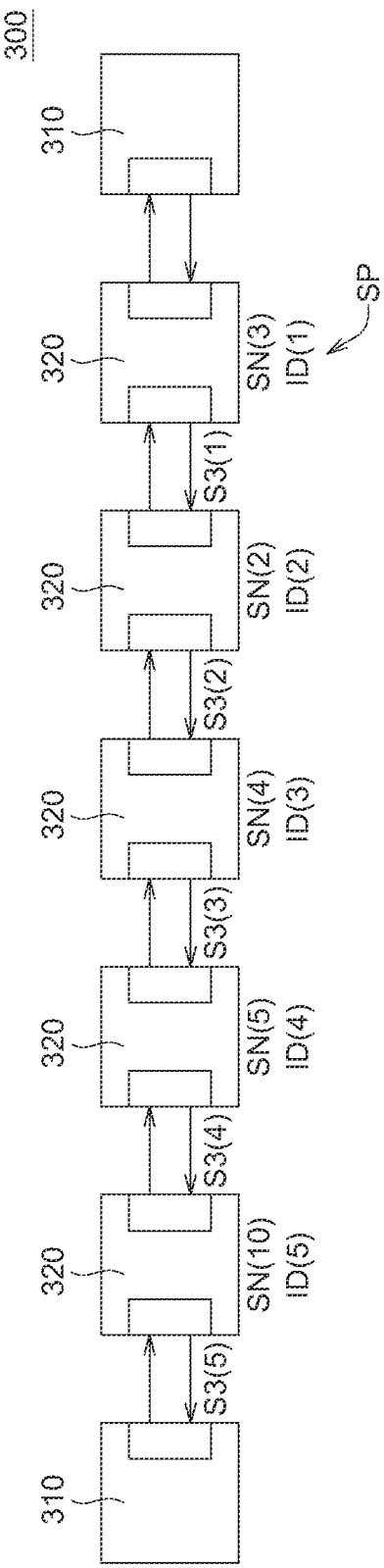

Then, the method proceeds to step S150 as indicated in FIG. 12, the identify number setting packet S3 is transmitted and accumulated from the middle chiplet 320 set as the starting point SP towards another end by the positioning number setting module 323 to set a positioning number ID of each middle chiplet 320.

As indicated in FIG. 12, the identify number setting packet S3 is transmitted and accumulated from the middle chiplet 320 set as the starting point SP (that is, the rightmost middle chiplet 320) towards the left end. The initial value of the identify number setting packet S3 is 1, and is accumulated by 1 each time when the identify number setting packet S3 is transmitted until all packets are transmitted to the end chiplet 310 at the right end. The positioning number setting module 323 uses the value of the identify number setting packet S3 transmitted by the middle chiplet 320 as the positioning number ID, and the value in the brackets denotes the value of the positioning number ID. Thus, from the rightmost middle chiplet 320 to the leftmost middle chiplet 320, the positioning numbers ID of the middle chiplet 320 respectively are 1 to 5.

According to the above embodiments, each time when the chiplet systems 200, 200', and 200", and 300 are electrified to operates, the positioning number of each of the middle chiplets 220 and 320 can be obtained through analysis, and there is no need to pre-set positioning numbers in the semiconductor process. Thus, the manufacturing cost of semiconductor can be greatly reduced; furthermore, in the packaging process, the middle chiplets 220 and 320 can be flexibly connected in series, so that the manufacturing flexibility can be greatly increased.

While the invention has been described by way of example and in terms of the preferred embodiment(s), it is to be understood that the invention is not limited thereto. Based on the technical features embodiments of the present invention, a person ordinarily skilled in the art will be able to make various modifications and similar arrangements and procedures without breaching the spirit and scope of protection of the invention. Therefore, the scope of protection of the present invention should be accorded with what is defined in the appended claims.

What is claimed is:

1. A positioning method of a chiplet system, comprising:
classifying two end chiplets and a plurality of middle chiplets;
transmitting and accumulating a quantity calculation packet from each of the end chiplets towards another end to analyze a quantity of the middle chiplets;
transmitting and accumulating a serial number comparison packet from each of the middle chiplets connected to one of end chiplets towards another end to set a starting point; and
transmitting and accumulating an identify number setting packet from the middle chiplet set as the starting point towards another end to set a positioning number of each of the middle chiplets.

2. The positioning method of the chiplet system according to claim 1, wherein each of the end chiplets or each of the middle chiplets is classified according to a quantity of at least one interface circuit.

3. The positioning method of the chiplet system according to claim 1, wherein an initial value of each of the quantity calculation packets is 0, and is accumulated by 1 each time when each of the quantity calculation packets is transmitted.

4. The positioning method of the chiplet system according to claim 3, wherein a final value of each of the quantity calculation packets is the quantity of the middle chiplets.

5. The positioning method of the chiplet system according to claim 1, wherein an initial value of each of the serial number comparison packets is a chip serial number, and is accumulated by 1 each time when each of the serial number comparison packets is transmitted.

6. The positioning method of the chiplet system according to claim 1, wherein an initial value of the identify number setting packet is 1, and is accumulated by 1 each time when the identify number setting packet is transmitted.

7. A chiplet system, comprising:
two end chiplets, wherein each of the end chiplets comprises:
a type determination module, configured to identify the each of the end chiplets; and
a quantity analysis module, configured to analyze a quantity of a plurality of middle chiplets; and
the middle chiplets, wherein each of the middle chiplets comprises:
a type determination module, configured to identify each of the middle chiplets;
a starting point setting module, configured to set a starting point; and
a positioning number setting module, configured to set a positioning number of each of the middle chiplets.

8. The chiplet system according to claim 7, wherein each of the end chiplets or each of the middle chiplets is classified according to a quantity of at least one interface circuit.

9. The chiplet system according to claim 7, wherein each of the quantity analysis modules transmits and accumulates a quantity calculation packet from each of the end chiplets towards another end to analyze the quantity of the middle chiplets.

10. The chiplet system according to claim 9, wherein and initial value of each of the quantity calculation packets is 0, and is accumulated by 1 each time when each of the quantity calculation packets is transmitted.

11. The chiplet system according to claim 10, wherein a final value of each of the quantity calculation packets is the quantity of middle chiplets.

12. The chiplet system according to claim 7, wherein each of the starting point setting modules transmits and accumulates a serial number comparison packet from each of the middle chiplets connected to one of the end chiplets towards another end to set the starting point.

13. The chiplet system according to claim 12, wherein an initial value of each of the serial number comparison packets is a chip serial number, and is accumulated by 1 each time when each of the serial number comparison packets is transmitted.

14. The chiplet system according to claim 7, wherein one of the positioning number setting modules transmits and accumulates an identify number setting packet from the middle chiplet set as the starting point towards another end to set a positioning number of each of the middle chiplets.

15. The chiplet system according to claim 14, wherein an initial value of the identify number setting packet is 1, and is accumulated by 1 each time when the identify number setting packet is transmitted.

\* \* \* \* \*